(12) United States Patent
Freeman et al.

(10) Patent No.: US 8,972,057 B1
(45) Date of Patent: Mar. 3, 2015

(54) SYSTEMS AND METHODS FOR GENERATING A ROBOTIC PATH PLAN IN A CONFINED CONFIGURATION SPACE

(71) Applicant: The Boeing Company, Chicago, IL (US)

(72) Inventors: Philip L. Freeman, Summerville, SC (US); Howie Choset, Pittsburgh, PA (US); Matthew Tesch, Pittsburgh, PA (US); Glenn Wagner, Pittsburgh, PA (US)

(73) Assignee: The Boeing Company, Chicago, IL (US)

( * ) Notice: Subject to any disclaimer, the term of this patent is extended or adjusted under 35 U.S.C. 154(b) by 131 days.

(21) Appl. No.: 13/737,182

(22) Filed: Jan. 9, 2013

(51) Int. Cl.
*G05B 19/04* (2006.01)
*B25J 11/00* (2006.01)
*G01C 21/34* (2006.01)
*B25J 9/16* (2006.01)

(52) U.S. Cl.
CPC ............. *B25J 9/1666* (2013.01); *Y10S 901/01* (2013.01); *Y10S 901/28* (2013.01); *G01C 21/34* (2013.01)
USPC ............... 700/255; 700/246; 700/250; 901/1; 901/28

(58) Field of Classification Search
USPC ................ 700/246, 250, 251, 252, 253, 255; 901/2, 4–16
See application file for complete search history.

(56) References Cited

U.S. PATENT DOCUMENTS

| | | | | |
|---|---|---|---|---|
| 5,835,684 | A  * | 11/1998 | Bourne et al. | 700/255 |
| 6,493,607 | B1 * | 12/2002 | Bourne et al. | 700/255 |
| 6,728,581 | B1 * | 4/2004  | Trovato et al. | 700/56 |
| 7,844,398 | B2 * | 11/2010 | Sato et al. | 701/301 |
| 8,185,265 | B2 * | 5/2012  | Nagano | 701/25 |
| 8,774,968 | B2 * | 7/2014  | Kim et al. | 700/246 |
| 2002/0059213 | A1 * | 5/2002 | Soga | 707/3 |
| 2010/0168950 | A1 * | 7/2010 | Nagano | 701/25 |
| 2011/0106306 | A1 * | 5/2011 | Kim et al. | 700/246 |
| 2011/0172818 | A1 * | 7/2011 | Kim et al. | 700/246 |

* cited by examiner

*Primary Examiner* — Jason Holloway
(74) *Attorney, Agent, or Firm* — Joseph M. Butscher; The Small Patent Law Group, LLC

(57) ABSTRACT

A method of automatic path planning for at least one robot within a confined configuration space, the robot including an arm having a plurality of joints and an end effector coupled to the arm. The method includes entering a plurality of process points into a computer, each process point being a location wherein the arm is to be positioned to perform a task, calculating one or more inverse kinematic solutions for each process point, clustering the inverse kinematic solutions into a set of clusters, and generating collision free paths between the clusters in the confined configuration space.

13 Claims, 5 Drawing Sheets

SYSTEMS AND METHODS FOR GENERATING A ROBOTIC PATH PLAN IN A CONFINED CONFIGURATION SPACE

BACKGROUND

The present disclosure relates generally to a robotic systems, and more particularly, to systems and methods for generating a robotic path plan in a confined configuration space.

Robots may be utilized to position and assemble parts in confined spaces that are awkward or may be difficult to reach with a human arm. For example, the robot may be utilized to perform various tasks required to install hundreds or potentially thousands of fasteners to assemble various parts. For example, an aircraft wingbox includes many parts that are required to fit together within predetermined tolerances. Accordingly, the robot may be utilized to both position the various parts for assembly and to mechanically couple the parts together after being positioned.

To position the various parts and to install the various fasteners, the robot travels along a path that places an end effector of the robot at a series of target locations, also referred to as process points, wherein a specific task is performed. For example, one task performed by a robot may include installing a single fastener at a specific position in the wingbox. Thus, it should be realized that to install many fasteners, the end effector of the robot is required to be positioned at many different locations in the wingbox. It is therefore desirable to move the robot along a path that is both efficient to reduce the amount of time required to assemble the various parts and also a path that avoids collisions between the robot and the various parts being assembled.

Typical robotic systems identify the path traveled by the robot using a conventional algorithm. More specifically, the conventional algorithm may utilize the kinematics of the robot to identify the path. However, in operation, the paths generated by the conventional algorithm may, in some cases, not enable the robot to avoid obstacles. Additionally, the paths generated by the conventional algorithm may not be time efficient when a large number of target locations are input to the algorithm.

SUMMARY

In accordance with one embodiment, a method for generating a robotic path plan in a confined configuration space is provided. The method includes entering a plurality of process points into a computer, each process point being a location wherein the arm is to be positioned to perform a task, calculating one or more inverse kinematic solutions for each process point, clustering the inverse kinematic solutions into a set of clusters, and generating collision free paths between the clusters in the confined configuration space.

In accordance with another embodiment, a method for applying fasteners in a wingbox is provided. The method includes reading in or identifying two or more process points along a row in task space, calculating one or more target configurations for each process point at an end of a row, calculating target configurations for each process point along the row by using a pseudo-inverse of a manipulator Jacobian, identifying process points that are not reachable in a collision free path, and placing the identified process points into a new row.

In accordance with another embodiment, a robot control system is provided. The robot control system includes a robot including an arm having a plurality of joints and an end effector coupled to the arm, a robot controller coupled to the robot and configured to reposition the robot in a plurality of positions, and a computer for performing automatic path planning for the robot. The computer is configured to receive a plurality of process points, each process point being a location wherein the arm is to be positioned to perform a task, calculate one or more inverse kinematic solutions for each process point, cluster the inverse kinematic solutions into a set of clusters, and generate collision free paths between the clusters in the confined configuration space.

The features, functions, and advantages that have been discussed can be achieved independently in various embodiments or may be combined in yet other embodiments, further details of which can be seen with reference to the following description and drawings.

DETAILED DESCRIPTION

Figure 1:
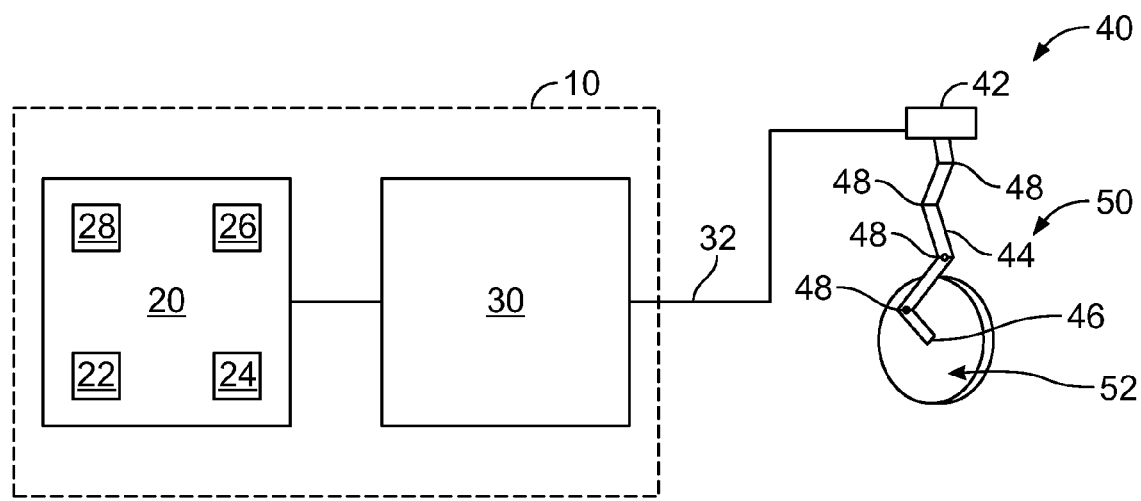
FIG. 1 is a block illustration of a robotic control system in accordance with one embodiment.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments described and/or illustrated herein provide methods and systems for generating a robotic path plan in a confined space. For example, one embodiment provides a system that is operable to develop one or more inverse kinematic solutions for each process point for one or more robots. Additionally, the system creates clusters of collision free paths based on the inverse kinematic solutions for the confined space and then connects the clusters by substantially collision free paths in the confined space. It should be appreciated that although an aircraft application is described herein, the various embodiments are not limited to aircraft applications, but the methods and systems described herein may be used in non-aircraft applications. For example, the various embodiments may be used in various land, air, sea and space applications.

In various embodiments, a robot control system 10 may be provided as illustrated in FIG. 1. The robot control system 10 may include a computer 20 and a robot controller 30. The computer 20 and/or the robot controller 30 may be embodied as a portable computer such as a laptop computer or a hand-held computer that transmits information to, and receives information from, a robot 40 and each other. As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer".

In various embodiments, the robot control system 10 is coupled to the robot 40 via a communication link 32 to enable signals output from the robot control system 10 to be transmitted to the robot 40. In operation, the signals output from the robot control system 10 direct the robot 40 to move along a desired path to a plurality of process points, also referred to herein as target locations, and to perform various tasks at the various process points. Optionally, the robot control system 10 may communicate wirelessly with the robot 40 via a RF connection (not shown), etc.

Figure 2:
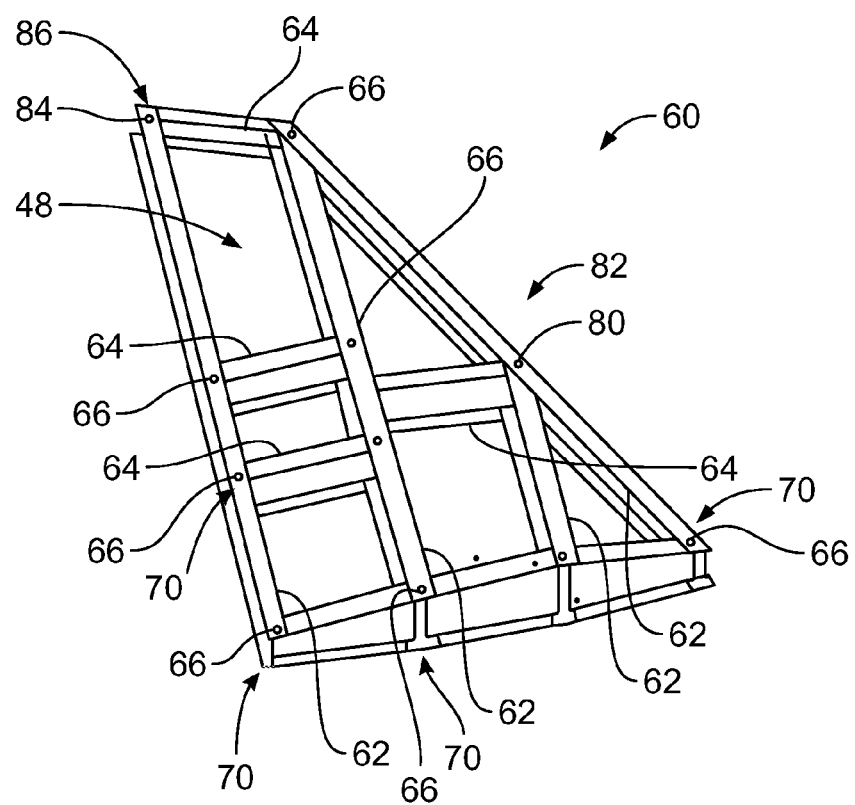
FIG. 2 is a partial cutaway of a wingbox assembly in accordance with one embodiment.

In the illustrated embodiment, the robot 40 is a redundant robot that is configured to operate in a confined space, such as the confined space 48 shown in FIG. 2. A confined space, in various embodiments, is a space or area that would be difficult, awkward or impossible to reach with a human arm. As shown in FIG. 1, the robot 40 includes a base 42, an articulated arm 44, and an end effector 46 that is disposed at a distal end of the arm 44. In the illustrated embodiment, the robot 40 has a plurality of joints 48 that enable the arm 44 to operate in a plurality of degrees of freedom (in the illustrated embodiment seven degrees of freedom). More specifically, the joints 48 enable the roll, pitch, and/or yaw of the articulated arm 44 to be adjusted and therefore enable the end effector 46 to be moved along a predetermined path to a plurality of process points within the confined space 48. In operation, the articulated arm 44 is operable within a free configuration space 50. A free configuration space, in various embodiments, is as an area around the arm 44 in which the arm 44 may move in a collision free manner. Thus, the configuration space is all physically achievable ways the arm 44 may be positioned if there are no obstacles and the free configuration space is the subset of the configuration space where the arm 44 is not in collision with obstacles. Thus, the arm 44 is movable in the configuration space 50 to reposition the end effector 46 at the plurality of process points or goal points. Moreover, the end effector 46 is movable in a workspace 52 to position a tool (not shown) attached to the end effector 46 to perform some task at the process point. Thus, the workspace, in various embodiments, is the area around the end effector 46 in which the end effector 46 may move in a collision free manner.

It should be realized that in operation, positioning the arm 44 at each process point may include moving the arm 44 through a series of nodes until the arm 44 is positioned in a target configuration. As used herein, a target configuration is a configuration, e.g. roll, yaw, pitch, etc. of the arm 44 that enables the arm 44 to be located at a specific process point. Thus, it should be realized that to move the arm 44 to a specific process point, the arm 44 is moved through a plurality of nodes until the arm 44 is in the target configuration. Additionally, it should be realized that for each process point, the arm 44 is placed in a different target configuration.

As discussed above, the confined space 48 may be any space that would be difficult, awkward, or impossible to reach with a human arm. In the illustrated embodiment shown in FIG. 2, the confined space 48 is a wingbox 60. The wingbox 60 may include, for example, a plurality of longitudinal spars 62 with transverse ribs 64 interspersed along the run of the spars 62. The spars 62 and the ribs 64 may be coupled together using, for example, a plurality of fasteners 66 located at various positions within the wingbox 60. It should therefore be realized that each fastener 66 represents a different process point 70 that may be accessed by the robot 40 to install the fasteners 66. For example, a first fastener 80 is located at a first process point 82, a second fastener 84 is located at a second process point 86, and an nth fastener is located at an nth process point, etc. It also should be realized that the wingbox 60 may include n fasteners 66. Accordingly, the robot 40 is configured to move along a path to install a fastener 66 at each of the n process points 70. The wingbox 60 also includes an upper skin (not shown) and a lower skin (not shown) that is coupled to the spars 62 and the ribs 64.

In operation, the robot controller 30 is configured to coordinate the movement or motion of the articulated arm 44, along a path that places the end effector 46 at the series of process points 70. As used herein, the movement of the articulated arm 44 to the various process points 70 is referred to as a traversal solution. Thus, it should be realized that it is desirable to generate a traversal solution that enables the articulated arm 44 to be moved to each of the process points 70, in the confined space 48, in a time efficient manner that also enables the articulated arm 44 to avoid any obstacles or obstructions within the confined space 48.

Accordingly, and referring again to FIG. 1, the computer 20 includes a path planning module 22 that is configured to automatically generate a plurality of paths 24 to enable at least one robot, such as the robot 40, to access each of the process points 70 in the confined space 48. Moreover, as discussed in more detail below, the computer 20 and/or the operator may select one of the paths as the traversal solution. It should be realized that although various embodiments are described herein referring to a single robot 40, that the path planning module 22 may be utilized to generate a plurality of paths 24 which may be utilized concurrently by a plurality of robots 40.

The path planning module 22 may be implemented as a piece of hardware that is installed in the computer 20. Optionally, the path planning module 22 may be implemented as a set of instructions that are installed on the computer 20. The set of instructions may be stand-alone programs, may be incorporated as subroutines in an operating system installed on the computer 20, may be functions in an installed software package on the computer 20, and the like. It should be understood that the various embodiments are not limited to the arrangements and instrumentality shown in the drawings.

The set of instructions may include various commands that instruct the path planning module 22 and/or the computer 20 as a processing machine to perform specific operations such as the methods and processes of the various embodiments described herein. The set of instructions may be in the form of a tangible and/or non-transitory computer readable medium. As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

In operation, the computer 20 is programmed to receive a plurality of process points 70. The computer 20 is further programmed to generate a plurality of paths 24 that places an end effector 46 of the robot 40 at the various process points. In various embodiments, the plurality of process points 70 received by the computer 20 are stored in a file 26 within the computer 20. As used herein, a file, in various embodiments, means a set of electronic records or related electronic information that is stored in the same location. Optionally, the plurality of process points 70 may be transmitted to the computer 20 for subsequent processing. The computer 20 is further configured to select one of the paths as a traversal solution 28 and then output the traversal solution 28 to the robot controller 30. The robot controller 30 may then be utilized to direct the movement of the robot 40 to the various process points 70 utilizing the traversal solution 28.

Figure 3:
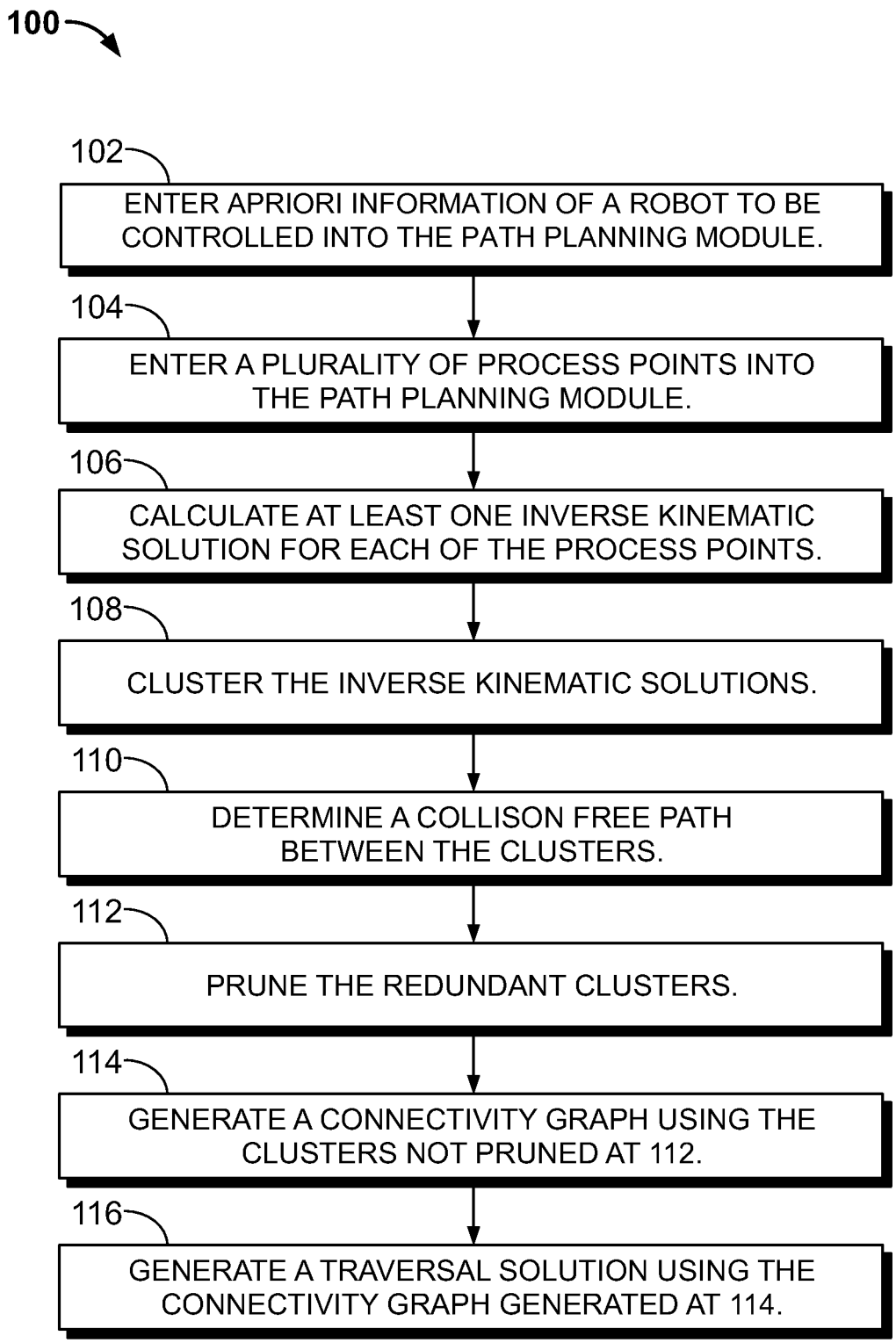
FIG. 3 is an illustration of operations for performing automatic path planning for at least one robot within a confined configuration space in accordance with one embodiment.

FIG. 3 illustrates operations of an exemplary method 100 that may be performed by the robot control system 10 shown in FIG. 1. In various embodiments, the method 100 may be utilized to perform automatic path planning for at least one robot within a confined space. The method 100 may be implemented using the path planning module 22 and/or the computer 20. Accordingly, the method 100 may be provided as a non-transitory machine-readable medium or media having instructions recorded thereon for directing the computer 20 and/or the path planning module 22 to perform an embodiment of the methods described herein. The medium or media may be, for example, any type of CD-ROM, DVD, floppy disk, hard disk, optical disk, flash RAM drive, or other type of computer-readable medium or a combination thereof.

In operation, the method 100 enables the path planning module 22 to develop one or more inverse kinematic solutions for each of the process points 70 for the one or more robots 40. Additionally, the path planning module 22 creates clusters of collision free paths 24 based on the inverse kinematic solutions for the confined configuration space, and then connects the clusters by substantially collision free paths in the confined configuration space to generate the traversal solution 28.

Referring to FIG. 3, at 102 a priori information of a robot to be controlled, such as the robot 40, is entered into the path planning module 22. The a priori information generally defines the operational characteristics of the robot 40. For example, the a priori information may include a length of the robot arm 44, the quantity of joints 48 in the robot arm 44, the degrees of freedom of the robot arm 44, and/or the distance to robot arm 44 may travel. etc.

At 104, a plurality of process points 70 are entered into the path planning module 22. In various embodiments, the process points 70 may be three-dimensional coordinates, Cartesian coordinates, etc. The process points 70 may be entered manually by the operator into the path planning module 22. Optionally, the process points 70 may be automatically extracted from a file, such as the file 24. The file 24 may include, for example, a mathematical table of the process points 70. Optionally, the file 24 may be computer aided design (CAD) drawings.

At 106, at least one inverse kinematic solution is calculated for each of the process points 70. In the exemplary embodiment, the path planning module 22 is configured to calculate a plurality of inverse kinematic solutions for each of the process points 70. For example, the path planning module 22 may calculate 10 or 100 inverse kinematic solutions for each of the process points 70. For example, assume that fifty process points 70 are entered at 104, and assume that 100 inverse kinematic solutions are calculated for each process point 70, then at 106, five thousand inverse kinematic solutions are calculated.

In general, inverse kinematics is a process of determining an arm configuration that places the end effector 46 at a given location, such as at a particular process point 70. Accordingly, an inverse kinematic solution is a path 22 that places the end effector 46 at a particular process point 70. To calculate an inverse kinematic solution, the shape of the arm 44 is represented by an element of the configuration space, q∈Q, which describes the joint angles and the base position of the robot arm 44. The position of the end effector 46 may be described as a point in the workspace w∈W. The two spaces are related by the forward kinematics map w∈f(q)=w which determines where the end effector 46 is in the works space 52 for a given set of joint angles. Inverse kinematics is therefore utilized to calculate q, given w, is generally more difficult, and does not result in a unique value of q for redundant systems.

More specifically, to calculate an inverse kinematic solution for each process point 70, a Jacobian is utilized. A Jacobian relates velocities in the configuration space 50 to velocities in the workspace 52 in accordance with:

$$\dot{w} = J(q)\dot{q} \qquad \text{Equation 1}$$

where $J(q)$ is a n×m matrix, n is the dimensionality of W and m is the number of joints 48 in the arm 46. Accordingly, $J(q)$ is used to determine how the shape of the arm 44 is changed to move the end effector 46 in a specific direction. More specifically, to calculate the shape of the arm 44 using $J(q)$, $J(q)$ must be inverted to form a pseudo-inverse of $J(q)$. However, it should be realized that $J(q)$ is not invertible because generally n≠m. Accordingly, in various embodiments, a Moore-Penrose pseudo-inverse of $J(q)$ may be utilized in place of the inverse of $J(q)$ to provide the least-squares approximation of q. Using the pseudo-inverse, denoted as $J(q)+$, an iterative process may be utilized to solve the inverse kinematics problem in accordance with:

$$q_i = q_{i-1} + \delta * J^+(w_t - f(q_{i-1})) \qquad \text{Equation 2}$$

where $w_t$ is the target end effector location, $q_i$ is a randomly selected seed configuration, and $\delta \in (0,1)$ is a rate constant. It should be realized that the above inverse kinematic solutions are simple and effective. However, the kinematic solutions for process points that are located proximate to each other may not have a tendency to have similar shapes and therefore may not have a tendency to form clusters.

More specifically, it is desirable to find a minimal cost path which places the end effector 46 at each process point 70. One approach for finding the minimal cost path is utilizing a algorithm known as a Traveling Salesman Problem (TSP). In operation, the TSP is typically solved on a connectivity graph 200, shown in FIG. 4, where the nodes 202 are used to represent the process points 70. Moreover, the lines 204 represent the connectivity between the process points 70 and the associated transition costs. The objective of the TSP is to find a minimal cost path in the connectivity graph 200 which visits each process point 70. However, the solution to the TSP is made more difficult by the factorial number of orderings in which the process points 70 may be visited as shown in FIG. 4.

Figure 4:
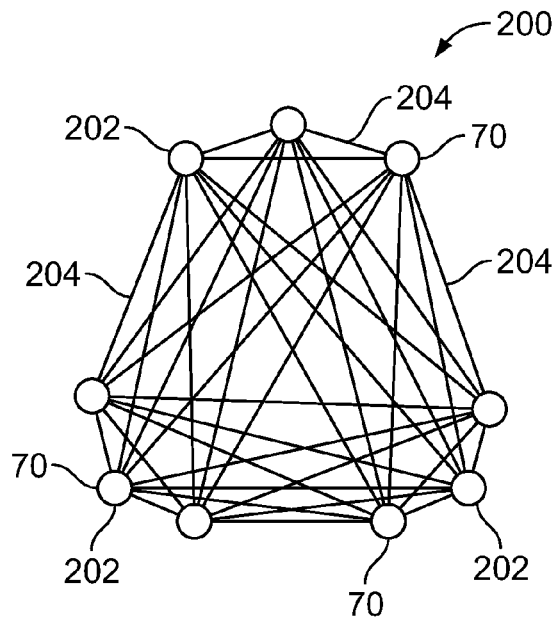
FIG. 4 is a connectivity graph formed in accordance with one embodiment.

The complexity of the TSP shown in FIG. 4 may be reduced to exploit the emergent structure of the connectivity graph 200. For example, in many manufacturing applications, the process points 70 may occur in clusters for which intra-cluster movement has minimal cost. As a result, the TSP is separated into planning a path over clusters and planning a path within each cluster using a cluster TSP (cTSP) solution. In operation the cTSP decomposes the TSP, shown in FIG. 4, into multiple smaller or clustered TSPs 232 as shown in the connectivity graph 230 of FIG. 5, which are more computationally efficient to solve than the single, large TSP shown in FIG. 4.

More specifically, in operation the redundant robot arm 44 can reach a process point 70 from a potentially infinite number of arm configurations, which are referred to herein as target configurations. As a result, nodes in the connectivity graph 230 are considered to represent target configurations, rather than directly representing the process points 70. Additionally, a set of target configurations which place the end effector 46 at the same process point 70 belong to the same equivalence class. In operation, the objective of the TSP is to visit one node from each equivalence class as shown in connectivity graph 200 shown in FIG. 4, a variant which is referred to herein as a generalized TSP (gTSP). However, considering more than one possible target configuration for each process point 70 may greatly reduce the cost of the path, but may also increase the cost of finding a solution to the TSP.

Figure 6:
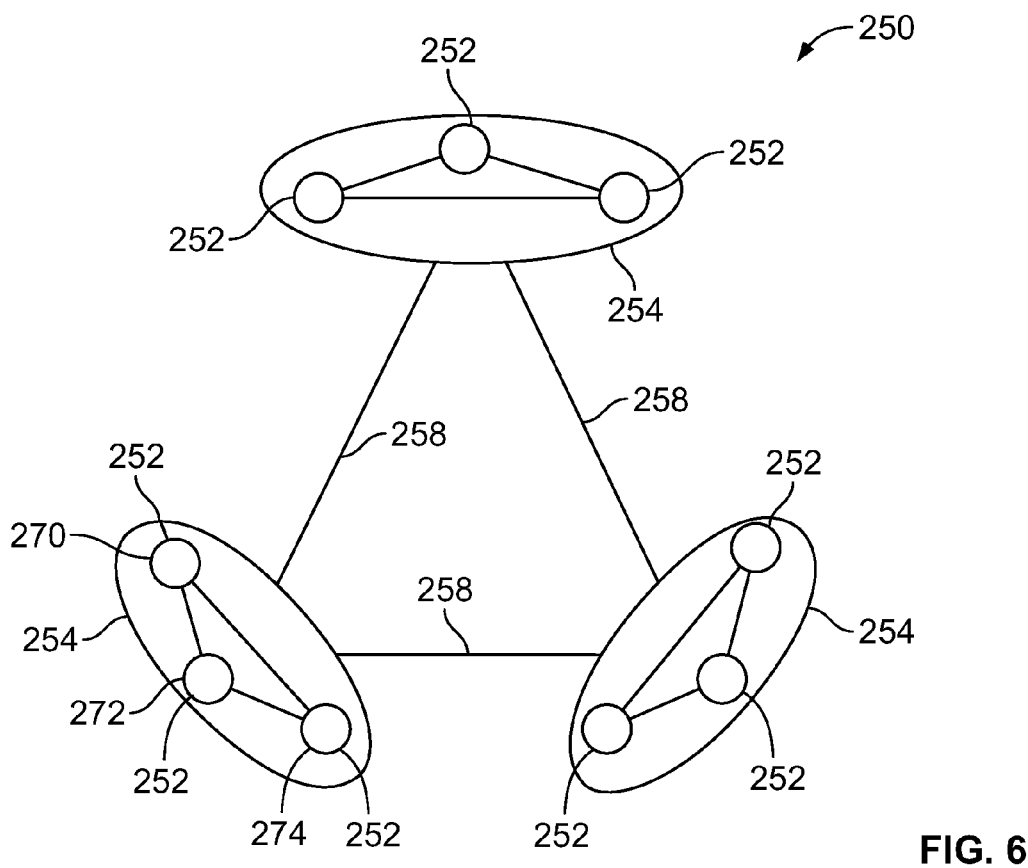
FIG. 6 is still another connectivity graph formed in accordance with one embodiment.

Therefore, in various embodiments described herein, the cTSP is combined with the gTSP to form the generalized clustered TSP (gcTSP) as shown in the connectivity graph 250 of FIG. 6. In the gcTSP, the nodes 252 are grouped into a plurality of clusters 254 with minimal intra-cluster transition costs, as in the cTSP. Additionally, the nodes 252 are also grouped into equivalence classes, as in the gTSP, based on which process point is reached by the target configuration represented by the node. In operation, the path found by the gcTSP visits at least one node 252 in each equivalence class, such that all the process points 70 are visited. The gcTSP is similar to an Errand Scheduling Problem (ESP). However, the ESP typically ignores the interior structure of a cluster, essentially treating the cluster as a single node from which multiple process points can be reached. The ESP therefore ignores the physical reality of the robot arm path planning problem. The gcTSP therefore decreases the cost of the TSP by modifying the algorithm used to construct the connectivity graph 200 to generate the connectivity graph 250 which includes useful clusters 254.

Figure 5:
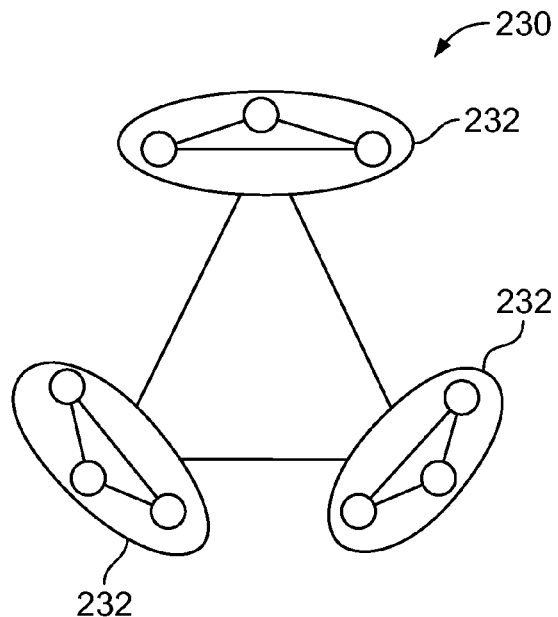
FIG. 5 is another connectivity graph formed in accordance with one embodiment.

Accordingly, and referring again to FIG. 2, at 108 the inverse kinematic solutions calculated at 106 are clustered. More specifically, the inverse kinematic solutions for each of the process points 70 are clustered based on how close the solutions are in the configuration space 50 and how easily the arm 44 may travel between process points 70 without colliding from one configuration to another as shown in FIG. 5.

In operation, the clusters 254 are generated using an arbitrarily ordered set of random configurations. The random configurations, for each process point 70, are determined by drawing starting points, or seeds, in order from the precomputed set of configurations, rather than randomly generating a new seed for each computation. The seeds are used in the same order when computing the inverse kinematics for each process point 70. More specifically, because Equation 2 drives the end effector 46 in a straight line in the workspace 52 from its location due to the seed, to its location due to the target configuration, solutions for nearby process points 70 derived from the same seed will generally be very similar. Such solutions will generally reach around the same side of a given obstacle, and will generally have the joints 48 pointing in the same direction. As a result, there is a simple path in the configuration space 50 between such solutions. Therefore, the clusters 254 are generated based on the existence of the simple paths in the configuration space 50.

Figure 7:
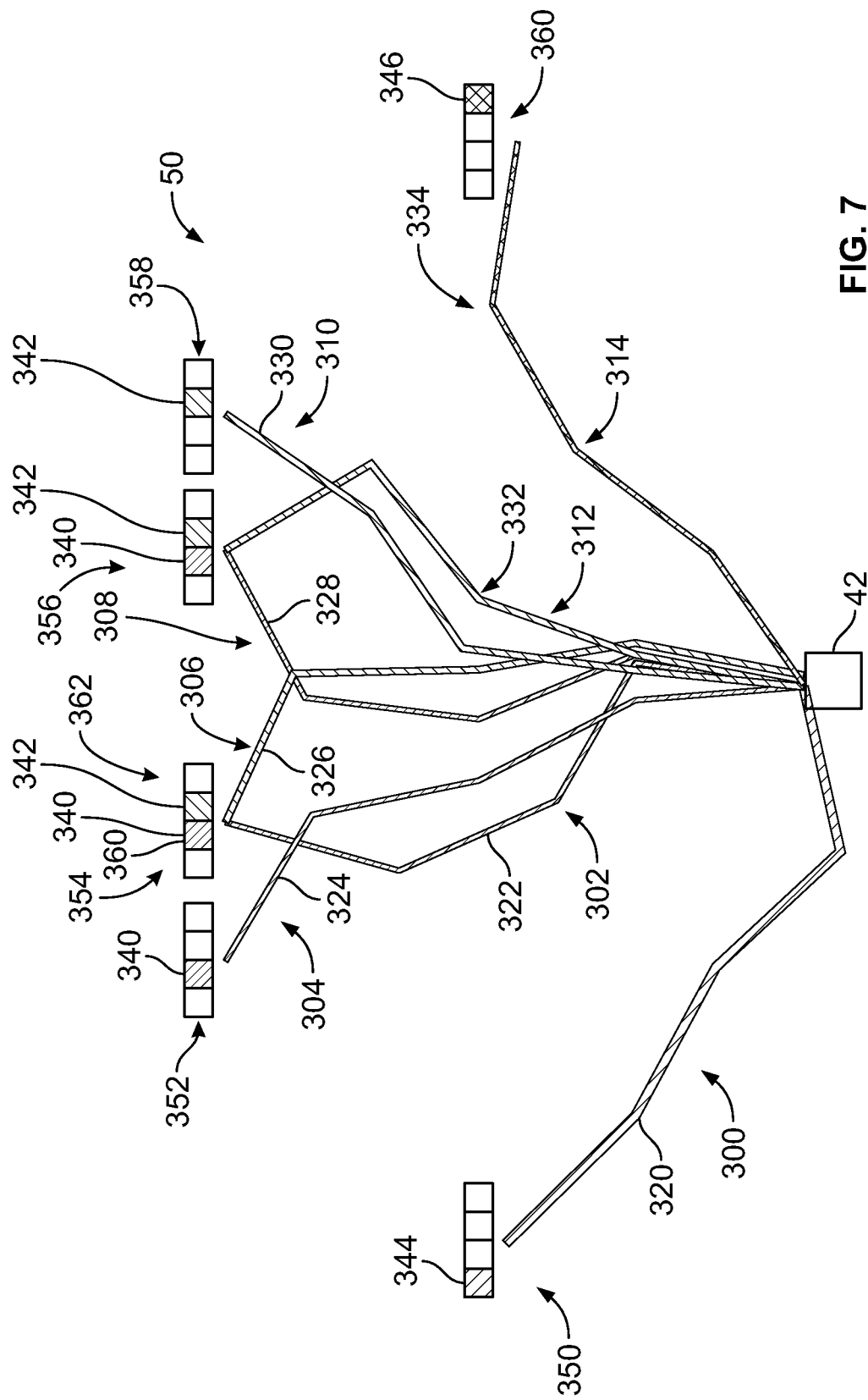
FIG. 7 illustrates a plurality of target configurations in accordance with one embodiment.

For example, FIG. 7 illustrates a plurality of target configurations 300, 302, 304, 306, 308, 310, 312, and 314 which are connected by collision free straight line paths 320, 322, 324, 326, 328, 330, 332, and 334 in the configuration space 50, either directly or through a sequence of such paths through other target configurations. As shown in FIG. 7, the points inside the cluster are called the nodes, which are in configuration space. For example, each of the nodes 340 are a single cluster, the nodes 342 are a single cluster, the nodes 344 are a single cluster, the nodes 346 are a single cluster, etc. Therefore, as shown in FIG. 7, there are six process points 350, 352, 354, 356, 358, and 360. Moreover, the process point 350 has a single node 344, the process point 352 has a single node 340, the process point 354 has two nodes 340 and 342, the process point 356 has two nodes 340 and 342, the process point 358 has a single node 342, and the process point 360 has a single node 346. Therefore, as shown in FIG. 7, the process points 354 and 356 each include the node 340 and the node 342, as such, each of these two nodes belong to two different clusters, a cluster that includes all the process points 340 and a different cluster that includes all the process points 342. Accordingly, the kinematic solutions are utilized to form the clusters. The clusters are then utilized to find a collision free path form cluster to cluster, which is computational easier than using the TSP.

Referring again to FIG. 3, at 110 a collision free path between the clusters is determined. Initially, the target configurations and the clusters are generated as described above. To generate the paths, it is desirable to visit as many different combinations of process points within a single cluster as possible to minimize the number of clusters which a path must visit to reach a given set of process points. For example, and referring again to FIG. 6, assume that the cluster 254 includes three different process points 270, 272, and 274. Therefore, it is desirable to visit each of the process points 270, 272, and 274 within the same cluster 254 before traveling to a different cluster.

However, it should be realized that there may be redundant clusters which cover the same sets of process points. More specifically, while the gcTSP solver may be used with redundant clusters to reduce the cost of the final path moderately, the redundant clusters may also increase the size of the intercluster TSP problem, thereby increasing the computational cost of the TSP.

Accordingly, in various embodiments, and referring again to FIG. 3, at 112 the redundant clusters are pruned. In operation, to prune the redundant clusters, the clusters 254 are sorted by the number of different process points 252 that are included in each cluster 254 as shown in FIG. 6. Any cluster 254 which includes a set of process points 252 which are a subset of those covered by a larger cluster are removed. For example, assume that a first cluster includes a set of process points (1, 2, 3, 5, 6), a second cluster includes a set of process points (4, 5), a third cluster includes a set of process points (4, 6), and a fourth cluster includes a set of process points (1, 2, 3, 6), then at 112, the fourth cluster (1, 2, 3, 6) would be identified as a redundant cluster and removed because the fourth cluster includes the same process points that are included in the first cluster. Therefore, the fourth cluster is redundant to the first cluster.

Referring again to FIG. 3, at 114 a connectivity graph is generated using the clusters not pruned at 112, i.e. the first, second, and third clusters. In use, the connectivity graph represents the connectivity between the entry nodes of the clusters. It should be noted that the node with the greatest number of direct neighbors is defined as the entry node for the cluster. For example, a node 360 may be defined an entry node for a cluster 362 as shown in FIG. 7. All inter-cluster paths will enter or leave the cluster through the same entry node. It should be realized that the boundaries describing the clusters may in some instances overlap. Therefore, a solution may belong to more than one cluster.

To identify the entry node into the clusters, a traversal solution is generated at 116 as shown in FIG. 3. The traversal solution has three properties: accessibility; connectivity; and departability. Thus, the traversal solution may be used to plan a path between two process points by finding a path onto the traversal solution (accessibility), then along the traversal solution (connectivity), and then from the traversal solution to the goal, i.e. the process point (departability). The traversal solution may be generated, using for example, a Probabilistic Traversal solution (PRM). In various embodiments described herein, the traversal solution is generated using a probabilistic approach referred to herein as bidirectional Rapidly-Exploring Random Trees (bidirectional RRT). Bidirectional RRTs grow one tree from a start configuration and a second tree from a goal configuration. The Bidirectional RRTs then connects the trees. For example, FIG. 8 illustrates the connection process utilized by the Bidirectional RRTs and is explained in more detail below.

Figure 8:
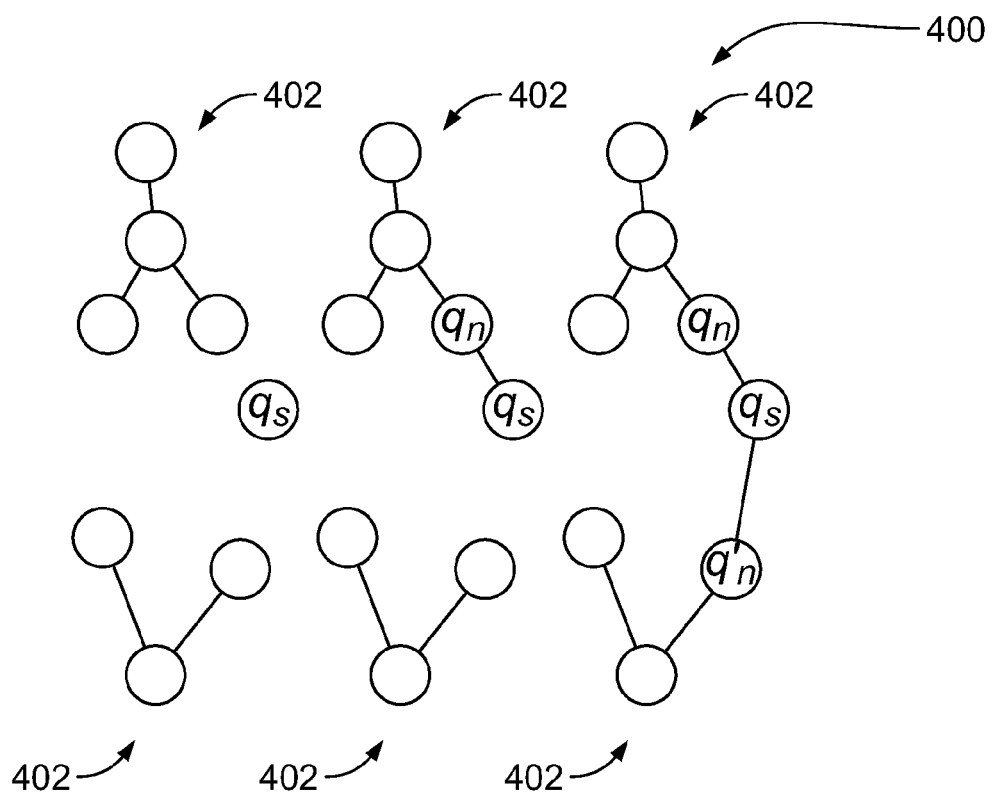
FIG. 8 is a tree that may be generated in accordance with one embodiment.

Referring to FIG. 8, in one embodiment, a tree 400 is constructed from the entry configuration in each cluster, and continues until all the trees 402 are merged. To grow the tree 400, a random sample $q_s$ is selected in one of the trees 402. The closest node $q_n$ to the random sample $q_s$ is identified in each of the trees 402. A local planner, or algorithm, then attempts to connect $q_s$ to $q_n$. If the local planner is successful in connecting $q_s$ to $q_n$, the $q_s$ is added to the tree containing the $q_n$. Subsequently, a node $q'_n$ is identified. The node $q'_n$ is a node that is closest to $q_s$ that is not in the tree containing $q_n$. The local planner then attempts to connect $q_s$ to $q'_n$. If the local planner is successful in connecting $q_s$ to $q'_n$, the trees containing $q_s$ and $q'_n$ are merged. This process is repeated until a single tree 400 remains as shown in FIG. 8. In use, the tree 400 ensures that any initial configuration of interest lies on the graph (accessibility), the tree 400 includes one connected component (connectivity), and each goal configuration of interest lies in the tree 400 (departability).

In some embodiments however, the RRT may generate arbitrarily bad paths. Accordingly, in various embodiments, the some additional random samples may be added to the final tree 400. The local planner may the be utilized to attempt to connect all pairs of configurations which are within a threshold distance of one another, while maintaining the connectivity found by the multidirectional RRT. Testing for new connectivity between configurations that were already in the RRT tree is effectively looking for shortcuts, while checking connectivity with the newly generated random sample results in looking for alternative paths. Subsequently, any of the new random samples which cannot be reached from the original RRT tree may be removed to ensure that the traversal solution includes a single connected component.

The various embodiments described herein may be utilized to fabricate aircraft wings which benefit from minimal frontal area, which may result in the use of thin structural elements to minimize drag. More specifically, various embodiments provide a method of controlling a robot to enable the robot to reach inside a wing to attach fasteners which reduces the time required to fabricate the wing and enables the fabrication of thinner, lower drag wings. The various embodiments are also useful for manufacturing aircraft which are built in comparatively low numbers and include a large number of different versions.

The various embodiments also enable the operator to add or remove process points. Moreover, the user may desire to skip one or more process points. The gcTSP therefore provides an efficient framework for finding partial traversal solutions. For example, when applying fasteners in the wingbox, the end effector 46 may include two incised grooves which slide down a double row of fasteners. As a result, sliding a narrow groove along a row of fasteners is equivalent to finding a path through a narrow corridor in the free configuration space, which is a known weakness for probabilistic planners. Therefore, the various embodiments described herein use inverse kinematics and cluster generation to exploit the structure of this problem. In various embodiments, the inverse kinematic solutions may be calculated by developing mechanical models for joint angles and joint arms for the one or more robots based on a dimensionality of and number of joints of the joint arms for the one or more robots.

In operation, each row of process points may be entered into the path planning module 22. However, the path planning module 22 may be configured to calculate a target configuration for the process point on the end of the row only. The inverse kinematics solutions for the other process points in the row may then be determined by sliding the end effector 46 in a straight line down the row from the initial target configuration using Equation 2. Additionally, various obstacles within the wing may prevent the arm 44 from sliding down the entire row. Therefore, the process points which are not reached may be split off into a new row. The inverse kinematics solution for the new row may then be determined separately.

Figure 9:
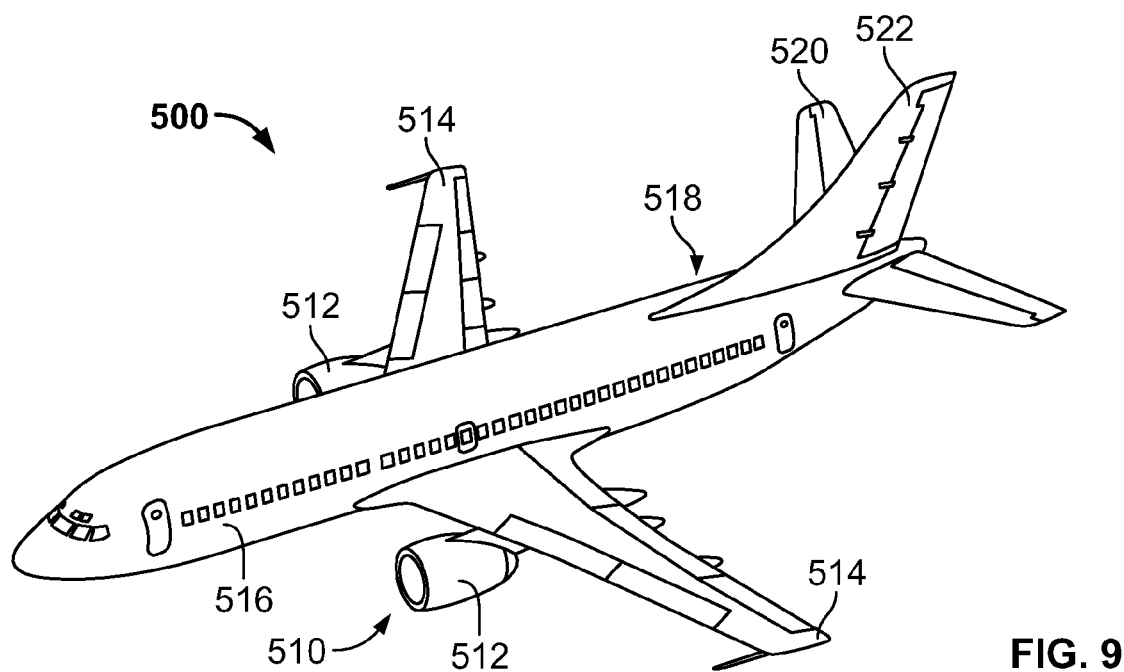
FIG. 9 is an aircraft that may be fabricated in accordance with one embodiment.

As described above, the robot control system 10 may be utilized to install fasteners in a wing or any other assembly such as an aircraft. For example, FIG. 9 illustrates an aircraft 500 that may be fabricated using the robot control system 10 described above. The aircraft 500 includes a propulsion system 510 that includes two turbofan engines 512. The engines 512 are carried by the wings 514 of the aircraft 500. In other embodiments, the engines 512 may be carried by the fuselage 516 and/or the empennage 518. The empennage 518 can also support horizontal stabilizers 520 and a vertical stabilizer 522.

It should be noted that the various embodiments or portions thereof, such as the robot control system 10 may be implemented in hardware, software or a combination thereof. The various embodiments and/or components, for example, the robot controller 30 also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical disk drive, and the like. The storage device may also be other similar means for loading computer programs or other instructions into the computer or processor.

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A method of automatic path planning for at least one robot within a confined configuration space, the robot including an arm having a plurality of joints and an end effector coupled to the arm, said method comprising using a robot control system to:
   receive a plurality of process points, each process point being a location wherein the arm is to be positioned to perform a task;
   calculate one or more inverse kinematic solutions for each process point;
   cluster the inverse kinematic solutions into a set of clusters; and
   generate collision free paths between the clusters in the confined configuration space.

2. The method of claim 1, further comprising using the robot control system to:
   remove redundant clusters in the set of clusters; and
   generate collision free paths between the remaining clusters in the confined configuration space.

3. The method of claim 2, further comprising using the robot control system to:
   generate a connectivity graph using the remaining clusters; and
   generate a traversal solution using the connectivity graph.

4. The method of claim 1, further comprising using the robot control system to designate a node with a greatest number of direct neighbors as an entry node for the cluster.

5. The method of claim 1, further comprising using the robot control system to generate a traversal solution of the joints that represent motion of the end effector in a specific direction.

6. The method of claim 1, further comprising using the robot control system to:
   identify the process points along a row of the process points,
   calculate one or more target configurations for a process point at the end of the row, and
   generate a plurality of target configurations for the remaining process points along the row by calculating the straight line motion of the end-effector using a pseudo-inverse of a Jacobian.

7. The method of claim 1, wherein using the robot control system to calculate one or more inverse kinematic solutions comprises using the robot control system to develop mechanical models for joint angles and joint arms for the one or more robots based on a dimensionality of and number of joints of the joint arms for the one or more robots.

8. A robot control system comprising:
   a robot including an arm having a plurality of joints and an end effector coupled to the arm;
   a robot controller coupled to the robot and configured to reposition the robot in a plurality of positions; and
   a computer for performing automatic path planning for the robot, said computer configured to:
   receive a plurality of process points, each process point being a location wherein the arm is to be positioned to perform a task;
   calculate one or more inverse kinematic solutions for each process point;
   cluster the inverse kinematic solutions into a set of clusters; and
   generate collision free paths between the clusters in the confined configuration space.

9. The robot control system of claim 8, wherein said computer is further programmed to:
   remove redundant clusters in the set of clusters; and
   generate collision free paths between the remaining clusters in the confined configuration space.

10. The robot control system of claim 8, wherein said computer is further programmed to:
    generate a connectivity graph using the remaining clusters; and
    generate a traversal solution using the connectivity graph.

11. The robot control system of claim 8, wherein said computer is further programmed to designate a node with a greatest number of direct neighbors as an entry node for the cluster.

12. The robot control system of claim 8, wherein said computer is further programmed to generate a traversal solution of the joints that represent motion of the end effector in a specific direction.

13. The robot control system of claim 8, wherein said computer is further programmed to:

identify the process points along a row of the process points, calculate one or more target configurations for a process point at the end of the row, and generate a plurality of target configurations for the remaining process points along the row by calculating the straight line motion of the end-effector using a pseudo-inverse of a Jacobian.

* * * * *